United States Patent
Zhang

(10) Patent No.: US 10,738,677 B2
(45) Date of Patent: Aug. 11, 2020

(54) METHOD FOR DETERMINING A CORRECTED NITROGEN OXIDE VALUE AND AMMONIA VALUE IN AN INTERNAL COMBUSTION ENGINE

(71) Applicant: CONTINENTAL AUTOMOTIVE GmbH, Hannover (DE)

(72) Inventor: Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 72 days.

(21) Appl. No.: 16/085,512

(22) PCT Filed: Feb. 2, 2017

(86) PCT No.: PCT/EP2017/052307
§ 371 (c)(1),
(2) Date: Sep. 14, 2018

(87) PCT Pub. No.: WO2017/157569
PCT Pub. Date: Sep. 21, 2017

(65) Prior Publication Data
US 2019/0112955 A1 Apr. 18, 2019

(30) Foreign Application Priority Data
Mar. 16, 2016 (DE) .................. 10 2016 204 323

(51) Int. Cl.
*F01N 3/20* (2006.01)
*F01N 9/00* (2006.01)
*F02D 41/14* (2006.01)

(52) U.S. Cl.
CPC ............... *F01N 3/208* (2013.01); *F01N 9/00* (2013.01); *F02D 41/1463* (2013.01);
(Continued)

(58) Field of Classification Search
CPC ...... F01N 3/208; F01N 9/00; F01N 2560/021; F01N 2560/026; F01N 2610/02;
(Continued)

(56) References Cited

U.S. PATENT DOCUMENTS

| 2007/0023020 A1 | 2/2007 | Yoshidome |
| 2010/0241340 A1 | 9/2010 | Weber et al. |

(Continued)

FOREIGN PATENT DOCUMENTS

| CN | 102900503 | 1/2013 |
| DE | 198 10 483 | 9/1999 |

(Continued)

OTHER PUBLICATIONS

Office Action dated Feb. 21, 2020 issued in Chinese Patent Application No. 201780017570.3.

*Primary Examiner* — Audrey K Bradley
(74) *Attorney, Agent, or Firm* — Cozen O'Connor

(57) ABSTRACT

A method for acquiring a corrected nitrogen oxide and/or corrected ammonia value in an internal combustion engine by determining that the engine is in an overrun cut-off phase, interrupting an injection of urea, acquiring a nitrogen oxide reference value from a nitrogen oxide reference signal generated by a nitrogen oxide sensor and acquiring an ammonia reference value from an ammonia reference signal generated by an ammonia sensor, and acquiring a corrected nitrogen oxide value from a nitrogen oxide signal generated by the nitrogen oxide sensor during normal operation of the engine, taking into account the nitrogen oxide reference value, and acquiring a corrected ammonia value from an ammonia signal generated by the ammonia sensor during normal operation of the engine, taking into account the ammonia reference value.

14 Claims, 2 Drawing Sheets

(52) U.S. Cl.
CPC .. *F01N 2560/021* (2013.01); *F01N 2560/026* (2013.01); *F01N 2560/14* (2013.01); *F01N 2610/02* (2013.01); *F01N 2900/1402* (2013.01); *F02D 2041/1468* (2013.01); *Y02T 10/24* (2013.01); *Y02T 10/47* (2013.01)

(58) Field of Classification Search
CPC ......... F01N 2560/14; F01N 2900/1402; F02D 41/1463; F02D 2041/1468
See application file for complete search history.

(56) References Cited

U.S. PATENT DOCUMENTS

| | | |
|---|---|---|
| 2012/0017568 A1 | 1/2012 | Geveci et al. |
| 2012/0234077 A1 | 9/2012 | Wang et al. |
| 2012/0255277 A1 | 10/2012 | Rajagopalan et al. |
| 2015/0068196 A1* | 3/2015 | Kowalkowski .... B01D 53/9431 60/286 |

FOREIGN PATENT DOCUMENTS

| | | |
|---|---|---|
| DE | 10 2008 039 687 | 3/2010 |
| DE | 11 2009 002 347 | 6/2013 |
| DE | 10 2013 014 674 | 3/2015 |
| EP | 2 843 205 | 3/2015 |
| JP | 2013-515897 | 5/2013 |

* cited by examiner

METHOD FOR DETERMINING A CORRECTED NITROGEN OXIDE VALUE AND AMMONIA VALUE IN AN INTERNAL COMBUSTION ENGINE

CROSS REFERENCE TO RELATED APPLICATIONS

This is a U.S. national stage of application No. PCT/EP2017/052307, filed on Feb. 2, 2017. Priority is claimed on German Application No. DE102016204323.4, filed Mar. 16, 2016, the content of which is incorporated herein by reference.

BACKGROUND OF THE INVENTION

1. Field of the Invention

The present invention relates to a method for acquiring a corrected nitrogen oxide value and a corrected ammonia value in an internal combustion engine, in particular to a method for acquiring a corrected nitrogen oxide value and a corrected ammonia value in an internal combustion engine that has an SCR catalytic converter and in which a nitrogen oxide sensor and an ammonia sensor are arranged downstream of the SCR catalytic converter.

2. Description of the Prior Art

In internal combustion engines, in particular in diesel internal combustion engines, it is known to use what are referred to as SCR (selective catalytic reduction) catalytic converters, which are used to reduce nitrogen oxides in the exhaust gases of the internal combustion engine. In this context, the chemical reaction at the SCR catalytic converter is selective, that is, the nitrogen oxides (NO, $NO_2$) are preferably reduced, while undesired secondary reactions, such as the oxidation of sulfur dioxide to form sulfur trioxide, are largely suppressed.

For the chemical reaction, urea is injected into the exhaust gas upstream of the SCR catalytic converter, which urea subsequently at least partially decomposes into ammonia that can react with the exhaust gas to form water and nitrogen within the SCR catalytic converter. For example, nitrogen oxide sensors and ammonia sensors are used to control the quantity of urea to be injected, in order to measure the respective portions in the exhaust section of the internal combustion engine and subsequently control the correct quantity of urea to be injected.

SUMMARY OF THE INVENTION

An object of one aspect of the invention is a method with which the nitrogen oxide values and ammonia values can be acquired on a vehicle-specific basis and as accurately as possible.

One aspect of the present invention is based on calibrating the nitrogen oxide sensors and the ammonia sensor during an overrun cut-off phase of the internal combustion engine, i.e. that a possibly occurring aging effect of the sensors can be reduced with the method according to the invention. In particular, the calibration is carried out during an operating state of the internal combustion engine, specifically during the overrun cut-off phase, during which there are no, or virtually no, nitrogen oxides in the exhaust section. Consequently, what is referred to as the zero offset of the respective nitrogen oxide sensors, and also that of the ammonia sensor, can be calibrated and set. In addition, the present invention is based on adapting the characteristic curves of a nitrogen oxide sensor arranged downstream of the SCR catalytic converter and the characteristic curve of a urea sensor arranged downstream of the SCR catalytic converter, by combining the two signals.

According to one aspect of the invention, a method for acquiring a corrected nitrogen oxide value in an internal combustion engine is provided which has an SCR catalytic converter, a nitrogen oxide sensor arranged downstream of the SCR catalytic converter, and a urea injection arrangement arranged upstream of the SCR catalytic converter. The method comprises determining that the internal combustion engine is in an overrun cut-off phase, interrupting the injection of urea by the urea injection device during the overrun cut-off phase, acquiring a nitrogen oxide reference value from a nitrogen oxide reference signal generated by the nitrogen oxide sensor during the overrun cut-off phase, and acquiring a corrected nitrogen oxide value from a nitrogen oxide signal generated by the nitrogen oxide sensor during normal operation of the internal combustion engine, taking into account the nitrogen oxide reference value.

During the overrun cut-off phase, for example during downhill travel, the injection of fuel into the cylinders of the internal combustion engine is interrupted, as result of which essentially air flows through the internal combustion engine. In addition, the injection of urea (for example metering of AdBlue) is also interrupted, as result of which the nitrogen oxide emissions and the urea emissions decrease. As result of this decrease in the nitrogen oxide emissions and urea emissions, both the respective signals of the nitrogen oxide sensor upstream of the SCR catalytic converter and the signals of the nitrogen oxide sensor downstream of the SCR catalytic converter are also reduced. In a similar way, the signal of the ammonia sensor downstream of the SCR catalytic converter is reduced.

The present disclosure also makes use of the fact that the nitrogen oxide sensor, which is arranged downstream of the SCR catalytic converter, is cross-sensitive to ammonia, that is to say the signal (referred to below as the "nitrogen oxide signal") of the nitrogen oxide sensor indicates the sum of nitrogen oxide and ammonia concentrations.

According to one aspect of the invention, a further method is disclosed for acquiring a corrected ammonia value in an internal combustion engine which has an SCR catalytic converter, a urea injection device arranged upstream of the SCR catalytic converter, and an ammonia sensor arranged downstream of the SCR catalytic converter. The inventive method according to this aspect of the present invention comprises determining that the internal combustion engine is in an overrun cut-off phase, interrupting the injection of urea by the urea injection device during the overrun cut-off phase, acquiring an ammonia reference value from an ammonia signal generated by the ammonia sensor during the overrun cut-off phase, and acquiring a corrected ammonia value from an ammonia signal generated by the ammonia sensor during normal operation of the internal combustion engine, taking into account the ammonia reference value.

According to a further aspect of the present invention, the two methods according to the invention are combined, that is to say the method for acquiring a corrected nitrogen oxide value and the method for acquiring a corrected ammonia value run simultaneously.

The respective methods are preferably not executed until the nitrogen oxide reference value is lower than a predetermined nitrogen oxide threshold value or the ammonia reference value is lower than a predetermined ammonia threshold value. It is even more preferred if the acquisition of a corrected nitrogen oxide value or the acquisition of a corrected ammonia value does not take place until an absolute change gradient of the reference signals of the nitrogen oxide sensor is lower than a predetermined change threshold value of nitrogen oxide or if an absolute change gradient of the reference signals of the ammonia sensor is less than a predetermined change threshold value of ammonia.

Within the scope of the present disclosure, an absolute change gradient describes the change over time in the signals that are detected briefly one behind the other within a predetermined time interval.

According to one preferred refinement, the method also comprises acquiring a difference in ammonia between an ammonia value acquired from the ammonia signal generated by the ammonia sensor during the normal operation of the internal combustion engine, and a further ammonia value acquired from the nitrogen oxide signal generated by the nitrogen oxide sensor during the normal operation of the internal combustion engine. The difference in ammonia can be an indication of drifting of the ammonia sensor. The following steps are subsequently executed during a subsequent overrun cut-off phase if the difference in ammonia acquired during the normal operation of the internal combustion engine is higher than a predetermined ammonia difference threshold value: activating the urea injection device to inject a predetermined quantity of urea during a predetermined time period, acquiring at least one first ammonia value from ammonia signals generated by the ammonia sensor, acquiring at least one second ammonia value from signals generated by the nitrogen oxide sensor, determining that the change gradient of the first ammonia signals is less than a first change threshold value, determining that the change gradient of the second ammonia values is less than a second change threshold value, and adapting a slope of the characteristic curve of the ammonia sensor by the second ammonia values if the change gradients of the first and second ammonia values are lower than the assigned change threshold value.

In such a preferred refinement, the nitrogen oxide sensor is cross-sensitive to ammonia, that is to say the signal of the nitrogen oxide sensor indicates the sum of nitrogen oxide and ammonia concentrations. In particular, such a refinement is preferred when there is a functioning SCR catalytic converter and high ammonia slip (for example in the case of ammonia over 40 ppm) in which the signal of the nitrogen oxide sensor arranged downstream of the SCR catalytic converter indicates essentially an ammonia value, since the nitrogen oxides in the SCR catalytic converter are converted and the concentration downstream of the SCR catalytic converter is significantly reduced. Therefore, the slope of the characteristic curve of the ammonia sensor can be adapted by measuring the ammonia by the nitrogen oxide sensor, which can measure significantly more accurately than the ammonia sensor.

According to one preferred refinement of the method according to the invention the nitrogen oxide reference value is acquired as follows:

$$NO_{X_{Ref,neu}} = NO_{X_{Ref,alt}} - K_1(T_{t1-t2}) \cdot NO_X$$

where:
$NO_{X_{Ref,neu}}$ nitrogen oxide reference value for the correction,
$NO_{X_{Ref,alt}}$ nitrogen oxide reference value of a preceding correction,
$K_1(T_{t1-t2})$ weighting factor between 0 and 1 depending on the operating time of the internal combustion engine between two corrections, and $NO_X$ currently acquired nitrogen oxide value (acquired during the overrun cut-off phase of the internal combustion engine, from a nitrogen oxide signal generated by the nitrogen oxide sensor);

In a similar way, the ammonia reference value can preferably be determined as follows:

$$NH_{3_{Ref,neu}} = NH_{3_{Ref,alt}} - K_2(T_{t1-t2}) \cdot NH_3$$

where:
$NH_{3_{Ref,neu}}$ ammonia reference value for the correction,
$NH_{3_{Ref,alt}}$ ammonia reference value of a preceding correction,
$K_2(T_{t1-t2})$ weighting factor between 0 and 1 depending on the operating time of the internal combustion engine between two corrections, and
$NH_3$ currently acquired ammonia value (acquired during the overrun cut-off phase of the internal combustion engine, from an ammonia signal generated by the ammonia sensor);

The weighting factors $K_1(T_{t1-t2})$ and $K_2(T_{t1-t2})$ are dependent on the engine operating state and the engine operating time between two adaptation processes and preferably lie in a range between 0 and 1.

In a further refinement of the method according to the invention, the internal combustion engine comprises a further nitrogen oxide sensor arranged upstream of the SCR catalytic converter. In this context, the method also comprises acquiring a further nitrogen oxide reference value from a nitrogen oxide signal generated by the further nitrogen oxide sensor during the overrun cut-off phase, and acquiring a corrected further nitrogen oxide value from a nitrogen oxide signal generated by the further nitrogen oxide sensor during normal operation of the internal combustion engine, taking into account the nitrogen oxide reference value.

In a further advantageous refinement, the corrected nitrogen oxide value which is acquired from a nitrogen oxide signal generated by the nitrogen oxide sensor is corrected as follows with the ammonia value which from an ammonia signal generated by the ammonia sensor:

$$NO_{X_{netto}} = NO_X - NH_3$$

where:
$NO_{X_{netto}}$ nitrogen oxide value which has been corrected and cleaned of ammonia,
$NO_X$ nitrogen oxide value which has been acquired from a nitrogen oxide signal generated by the nitrogen oxide sensor, and
$NH_3$ ammonia value which has been acquired from an ammonia signal generated by the ammonia sensor.

According to a further aspect of the present disclosure, an exhaust section for an internal combustion engine is disclosed, which exhaust section has an SCR catalytic converter, a nitrogen oxide sensor arranged downstream of the SCR catalytic converter and designed to generate a nitrogen oxide signal that indicates the nitrogen oxide value downstream of the SCR catalytic converter, a urea injection device arranged upstream of the SCR catalytic converter and designed to inject a predetermined quantity of urea, an ammonia sensor arranged downstream of the SCR catalytic converter and designed to generate an ammonia signal which indicates the ammonia value downstream of the SCR catalytic converter, and a control unit designed to receive the nitrogen oxide signal and the ammonia signal and execute a method according to the present disclosure.

In one preferred refinement, the exhaust section also has a further nitrogen oxide sensor arranged upstream of the SCR catalytic converter and designed to generate a further nitrogen oxide signal which indicates the nitrogen oxide value.

BRIEF DESCRIPTION OF THE DRAWINGS

Further objects and features of the invention would be obvious to the person skilled in the art taking into account the appended drawings, in which.

DETAILED DESCRIPTION OF THE PRESENTLY PREFERRED EMBODIMENTS

Figure 1:
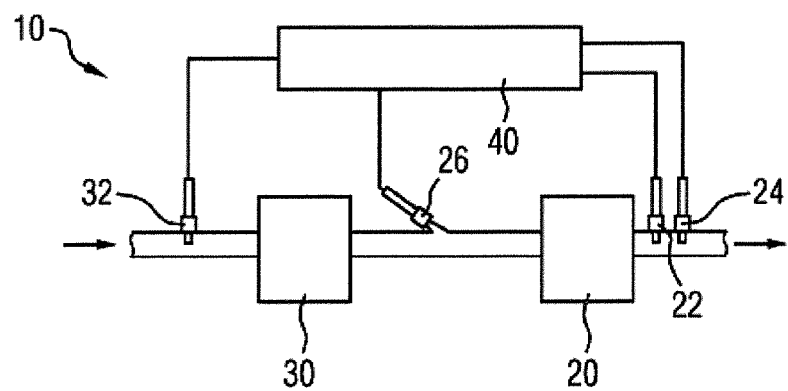
FIG. 1 is part of an exhaust section, disclosed by way of example, of an internal combustion engine.

FIG. 1 shows a schematic view of part of an exhaust section 10 of an internal combustion engine (not illustrated in more detail). The exhaust section 10 has an SCR catalytic converter 20 designed to carry out a chemical reaction so that the nitrogen oxides in the exhaust gas can be reduced. A particle filter, for example a diesel particle filter, is arranged upstream of the SCR catalytic converter 20. A nitrogen oxide sensor 22 and an ammonia sensor 24 are arranged downstream of the SCR catalytic converter 20 and are designed to generate corresponding signals. In particular, the nitrogen oxide sensor 22 is designed to generate a nitrogen oxide signal that indicates a nitrogen oxide value. In a similar way, the ammonia sensor 24 is designed to generate an ammonia signal that indicates an ammonia value.

In one preferred refinement, the nitrogen oxide sensor 22 and the ammonia sensor 24 are integrated in one sensor.

A urea injection device 26 is arranged upstream of the SCR catalytic converter 20 and is designed to inject a predetermined quantity of urea at predetermined times. The urea solution is designed to be decomposed by the exhaust gas in such a way that ammonia is at least partially produced, which ammonia can react chemically in the SCR catalytic converter 20 and therefore reduce the nitrogen oxides in the exhaust gas.

According to the exemplary refinement of the exhaust section 10 illustrated in FIG. 1, a further nitrogen oxide sensor 32 is also provided upstream of the particle filter 20, which further nitrogen oxide sensor 32 is designed to generate a further nitrogen oxide signal which indicates a nitrogen oxide value.

A control unit 40, which can be, for example, a component of the controller of the internal combustion engine, is connected to the nitrogen oxide sensor 22, the ammonia sensor 24, the urea injection device 26, and the further nitrogen oxide sensor 32, and is designed to receive signals from these devices and transmit said signals to the controller thereof.

Figure 2:
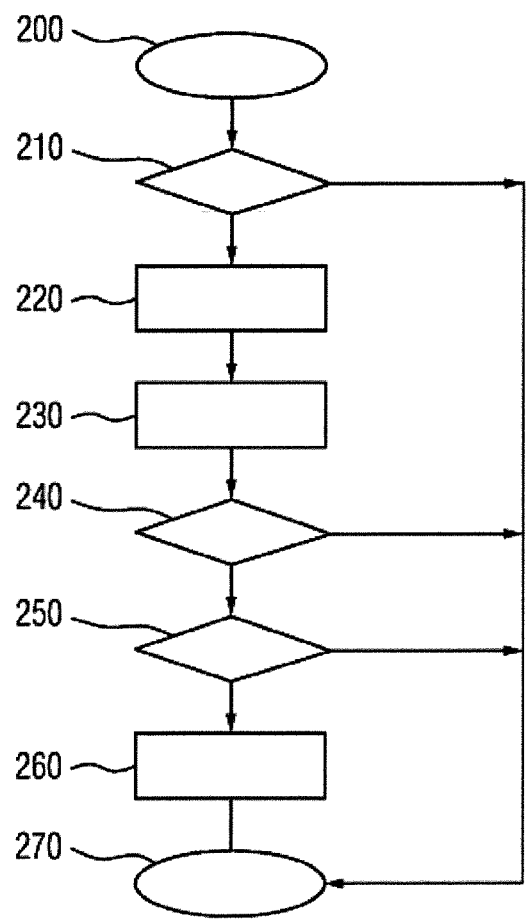
FIG. 2 is a flowchart according to an exemplary method for acquiring a corrected nitrogen oxide value and/or a corrected ammonia value.

The controller 40 is designed to execute a method according to FIG. 2. The method according to FIG. 2 starts at the step 200 and determines, at the step 210, whether the internal combustion engine is in an overrun cut-off phase. If it is determined at the step 210 that the internal combustion engine is in a normal operating mode with thrust, the method proceeds to step 270 at which it is ended.

However, if it is determined at step 210 that the internal combustion engine is in an overrun cut-off phase, for example when traveling downhill, the method proceeds to step 220, at which in addition to the interruption of the fuel injection, the supply of urea by the urea injection device 26 is also interrupted during the overrun cut-off phase.

Subsequently, at step 230 a nitrogen oxide reference value is acquired from a nitrogen oxide reference signal generated by the nitrogen oxide sensor 22 during the overrun cut-off phase and/or an ammonia reference value is acquired from the ammonia reference signal generated by the ammonia sensor 24 during the overrun cut-off phase.

At step 240 it is checked whether the nitrogen oxide value or the ammonia value downstream of the SCR catalytic converter 20 is lower than a nitrogen oxide threshold value or lower than a predetermined ammonia threshold value. If only one of the two values is above the respective threshold value, the method proceeds to step 270 at which it is ended. At this point it is to be noted that due to the linear sensor characteristic curves at step 240, instead of the comparison of the values with a predetermined threshold value the signals, which are generated by the respective sensors, can be compared directly with a corresponding predetermined threshold signal.

However, if both values are lower than their assigned, predetermined threshold value, the method continues with step 250, at which it is determined whether an absolute change gradient of the respective values is lower than an assigned threshold value. In particular, at the value 250 it is determined whether an absolute change gradient of the reference signals of the nitrogen oxide sensor 22 is lower than a predetermined nitrogen oxide change threshold value, or whether an absolute change gradient of the reference signals of the ammonia sensor 24 is lower than a predetermined ammonia change threshold value. The determination at step 250 can also be carried out directly with the signals generated by the sensors 22, 24 here.

If just one of the two absolute change gradients is above its respective predetermined change threshold value, the method proceeds to step 270 at which the method is ended.

However, if it is determined at step 250 that both change gradients are lower than their respective change threshold value, the method continues with step 260 at which both the nitrogen oxide reference value is adapted according to the formula (1) and the ammonia reference threshold value is adapted according to the formula (2).

$$NO_{X_{Ref,neu}} = NO_{X_{Ref,alt}} - K_1(T_{t1-t2}) \cdot NO_X \quad (1)$$

$$NH_{3_{Ref,neu}} = NH_{3_{Ref,alt}} - K_2(T_{t1-t2}) \cdot NH_3 \quad (2)$$

where:

$NO_{X_{Ref,neu}}$ nitrogen oxide reference value for the correction, $NO_{X_{Ref,alt}}$ nitrogen oxide reference value of a preceding correction, $K_1(T_{t1-t2})$ weighting factor between 0 and 1 depending on the operating time of the internal combustion engine between two corrections, and $NO_X$ currently acquired nitrogen oxide value (acquired during the overrun cut-off phase of the internal combustion engine, from a nitrogen oxide signal generated by the nitrogen oxide sensor), $NH_{3_{Ref,neu}}$ ammonia reference value for the correction, $NH_{3_{Ref,alt}}$ ammonia reference value of a preceding correction, $K_2(T_{t1-t2})$ weighting factor between 0 and 1 depending on the operating time of the internal combustion engine between two corrections, and NH<sub>3</sub> currently acquired ammonia value (acquired during the overrun cut-off phase of the internal combustion engine, from an ammonia signal generated by the ammonia sensor 24).

Figure 3:
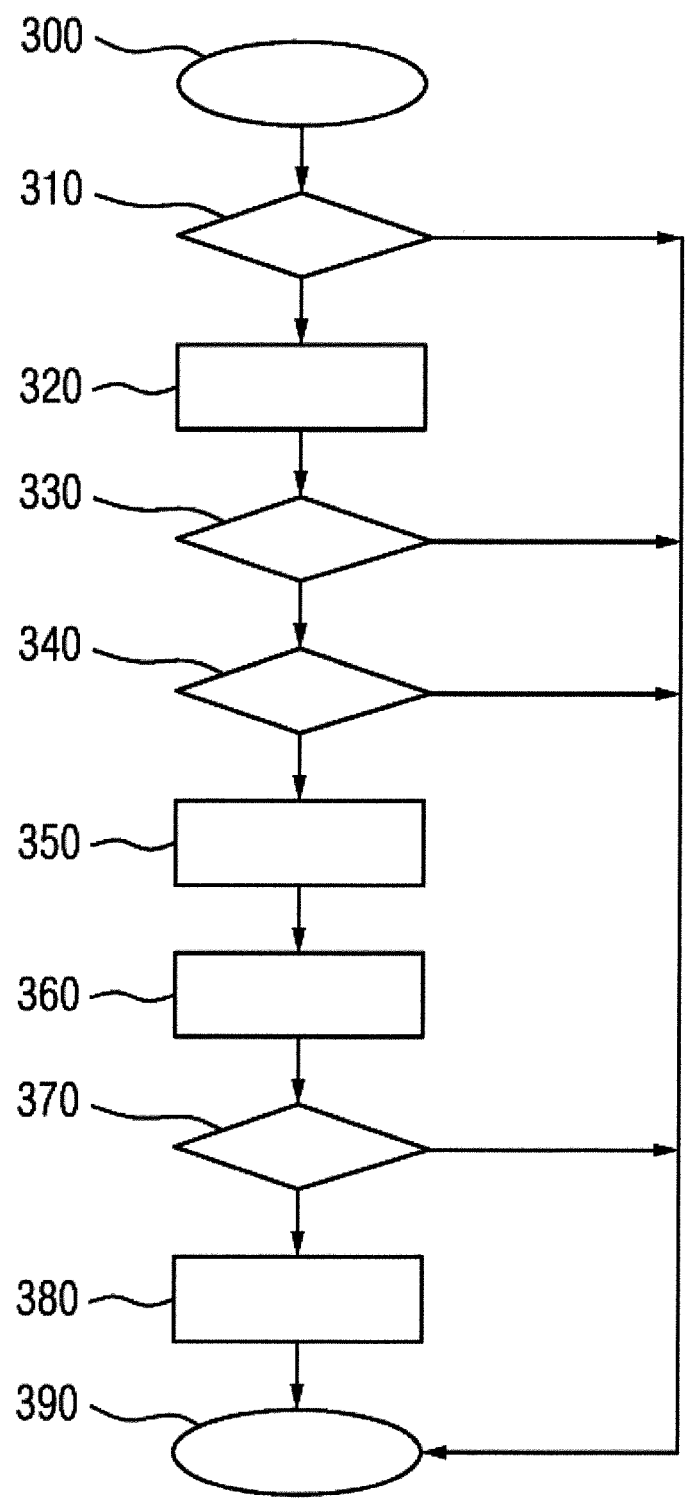
FIG. 3 is a flowchart for adapting the slope of a characteristic curve of an ammonia sensor according to the present disclosure.

Referring to FIG. 3, a further exemplary method according to the present disclosure is illustrated as a flowchart which starts at 300. At step 310 it is determined whether the internal combustion engine is in a normal operating mode. In this context, the term normal operating mode is intended to mean that the internal combustion engine operates by burning fuel and provides thrust correspondingly.

If it is determined at step 310 that a normal operating mode of the internal combustion engine, for example an overrun cut-off phase, is present, the method proceeds to step 390 and ends there.

In addition, at step 310 it is determined whether the ammonia slip of the SCR catalytic converter is above a predetermined threshold value, for example above 40 ppm. Since the nitrogen oxide sensor is cross-sensitive to ammonia, the nitrogen oxide sensor measures the sum of nitrogen oxides and ammonia. Accordingly, when there is a sufficiently large amount of ammonia slip it is possible to assume that the signal of the ammonia sensor 24 is essentially equal to the signal of the nitrogen oxide sensor 32, provided that the SCR catalytic converter is operating satisfactorily and can significantly reduce the nitrogen oxides.

If it is determined at step 310 that the internal combustion engine is in the normal operating mode and that the ammonia slip is higher than a predetermined threshold value, at step 320 both the nitrogen oxide sensor 22 and the ammonia sensor 24 generate corresponding signals.

In the subsequent step 330, a difference in ammonia is formed between the ammonia value acquired from the nitrogen oxide signal and the ammonia value acquired from the ammonia signal. At step 330, it is also determined whether this difference in ammonia exceeds a predetermined ammonia difference threshold value. If it is determined at step 330 that the ammonia difference threshold value is not exceeded, the method proceeds to step 390 and ends there.

However, if it is determined at step 330 that the difference in ammonia exceeds the ammonia difference threshold value, the method proceeds to step 340. In particular, at step 330 it is determined whether the signal generated by the ammonia sensor 24 deviates significantly from the nitrogen oxide signal generated by the nitrogen oxide sensor 22 and which essentially indicates ammonia during the prevailing operating state of the internal combustion engine. This deviation can be checked, for example, with the difference in ammonia.

At step 340 it is determined whether the internal combustion engine has changed from the normal operating mode into an overrun cut-off mode. If it is determined at step 340 that the internal combustion engine continues to be in the normal operating mode, the method proceeds to step 390 and is ended.

However, if it is determined at step 340 that the internal combustion engine has changed from the normal operating mode into an overrun cut-off mode, the method proceeds to step 350 at which the urea injection device 26 is controlled in such way that despite the overrun cut-off phase said urea injection device 26 injects a predetermined quantity of urea for a predetermined time period (for example a few seconds), so that an ammonia concentration above a threshold value, for example of more than approximately 40 ppm, is reached at a position downstream of the SCR catalytic converter 20.

However, a pre-condition here is that an ammonia trap catalytic converter and/or a further SCR catalytic converter for oxidizing ammonia or for storing SCR are/is present downstream of the two sensors 22, 24, so that the ammonia emissions do not exceed the legal limiting value.

Subsequently, at step 360 the nitrogen oxide sensor 22 and the ammonia sensor 24 generate corresponding signals during the overrun cut-off phase. It is to be noted here that due to the overrun cut-off phase the signals of the nitrogen oxide sensor 22 indicate essentially an ammonia value, since there are essentially no nitrogen oxides present.

At the subsequent step 370 it is determined that the first ammonia values acquired from the signals of the nitrogen oxide sensor 22 and the second ammonia values acquired from the ammonia signals of the ammonia sensor 24 are at least partially stable, i.e. the change gradients of the first and second ammonia values are each lower than a predetermined first or second change threshold value. If it is determined at step 370 that the first and second ammonia values are, at least in some cases, not stable, the method proceeds to step 390 and is ended.

However, if it is determined at step 370 that the first and second ammonia values are, at least in some cases, stable, the method proceeds to step 380 at which the signals of the nitrogen oxide sensor 22 which indicate the ammonia values are used to adapt the slope of the characteristic curve of the ammonia sensor 24. In this context, allowance is made, in particular, for the fact that the nitrogen oxide sensor 22 can measure more accurately than the ammonia sensor 24.

At step 390, the urea injection, which is activated at step 350, is ended again, and the method for adapting the characteristic curve of the ammonia sensor 24 is concluded by the signals of the nitrogen oxide sensor 22.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for acquiring a corrected nitrogen oxide value in an internal combustion engine which has an SCR catalytic converter, a nitrogen oxide sensor arranged downstream of the SCR catalytic converter, and a urea injection device arranged upstream of the SCR catalytic converter, comprising:

determining that the internal combustion engine is in an overrun cut-off phase;

interrupting an injection of urea by the urea injection device during the overrun cut-off phase;

acquiring a nitrogen oxide reference value from a nitrogen oxide reference signal generated by the nitrogen oxide sensor during the overrun cut-off phase; and acquiring a corrected nitrogen oxide value from a nitrogen oxide signal generated by the nitrogen oxide sensor during normal operation of the internal combustion engine, based at least in part on the nitrogen oxide reference value, wherein at least one of:
the acquisition of a nitrogen oxide reference value or an acquisition of an ammonia reference value does not take place until a corrected ammonia value absolute change gradient of the reference signal of the nitrogen oxide sensor is lower than a predetermined change threshold value of nitrogen oxide or if an absolute change gradient of a reference signal of an ammonia sensor is less than a predetermined ammonia change threshold value and the acquisition of the nitrogen oxide reference value or an acquisition of an ammonia reference value does not take place until an absolute change gradient of the reference signal of the nitrogen oxide sensor is lower than a predetermined change threshold value of nitrogen oxide or if an absolute change gradient of a reference signal of an ammonia sensor is less than a predetermined ammonia change threshold value.

2. The method as claimed in claim 1, wherein the acquisition of the nitrogen oxide reference value or the acquisition of the ammonia reference value does not take place until a nitrogen oxide value is lower than a predetermined nitrogen oxide threshold value and/or an ammonia value is lower than a predetermined ammonia threshold value.

3. The method as claimed in claim 1, further comprising:
acquiring a difference in ammonia between an ammonia value acquired from an ammonia signal generated by an ammonia sensor during a normal operation of the internal combustion engine, and a further ammonia value acquired from the nitrogen oxide signal generated by the nitrogen oxide sensor during the normal operation of the internal combustion engine, executing, during a subsequent overrun cut-off phase if the difference in ammonia acquired during the normal operation of the internal combustion engine is higher than a predetermined ammonia difference threshold value:
activating the urea injection device to inject a predetermined quantity of urea during a predetermined time period;
acquiring at least one first ammonia value from ammonia signals generated by the ammonia sensor;
determining that a change gradient of the at least one first ammonia value is less than a predetermined first change threshold value,
acquiring at least one second ammonia value from signals generated by the nitrogen oxide sensor;
determining that a change gradient of the at least one second ammonia value is less than a predetermined second change threshold value; and
adapting a slope of a characteristic curve of the ammonia sensor based at least in part on the second ammonia values if the change gradient of the at least one first or second ammonia value is lower than the predetermined first or second change threshold value.

4. The method as claimed in claim 1, wherein the nitrogen oxide reference value is acquired as follows:

$$NO_{X_{Ref,neu}} = NO_{X_{Ref,alt}} - K_1(T_{t1-t2}) \cdot NO_X$$

where:
$NO_{X_{Ref,neu}}$ nitrogen oxide reference value for a correction,
$NO_{X_{Ref,alt}}$ nitrogen oxide reference value of a preceding correction, $K_1(T_{t1-t2})$ weighting factor between 0 and 1 depending on an operating time of the internal combustion engine between two corrections, and
$NO_X$ currently acquired nitrogen oxide value (acquired during the overrun cut-off phase of the internal combustion engine, from a nitrogen oxide signal generated by the nitrogen oxide sensor;
and/or wherein a new ammonia reference value is determined as follows:

$$NH_{3_{Ref,neu}} = NH_{3_{Ref,alt}} - K_2(T_{t1-t2}) \cdot NH_3$$

where:
$NH_{3_{Ref,neu}}$ ammonia reference value for a correction,
$NH_{3_{Ref,alt}}$ ammonia reference value of a preceding correction,
$K_2(T_{t1-t2})$ weighting factor between 0 and 1 depending on an operating time of the internal combustion engine between two corrections, and
$NH_3$ currently acquired ammonia value (acquired during the overrun cut-off phase of the internal combustion engine, from an ammonia signal generated by an ammonia sensor.

5. The method as claimed in claim 1, wherein the internal combustion engine has a further nitrogen oxide sensor arranged upstream of the SCR catalytic converter, wherein the method further comprises:
acquiring a further nitrogen oxide value from a nitrogen oxide reference signal generated by the further nitrogen oxide sensor during the overrun cut-off phase; and
acquiring a corrected further nitrogen oxide value from a nitrogen oxide signal generated by the further nitrogen oxide sensor during normal operation of the internal combustion engine, based at least in part on the nitrogen oxide reference value.

6. The method as claimed in claim 1, wherein the corrected nitrogen oxide value which is acquired from a nitrogen oxide signal generated by the nitrogen oxide sensor is corrected as follows with an ammonia value which from an ammonia signal generated by an ammonia sensor:

$$NO_{X_{netto}} = NO_X - NH_3$$

where:
$NO_{X_{netto}}$ nitrogen oxide value which has been corrected and cleaned of ammonia,
$NO_X$ nitrogen oxide value which has been acquired from a nitrogen oxide signal generated by the nitrogen oxide sensor, and
$NH_3$ ammonia value which has been acquired from an ammonia signal generated by an ammonia sensor.

7. A method for acquiring a corrected ammonia value in an internal combustion engine which has an SCR catalytic converter, a urea injection device arranged upstream of the SCR catalytic converter, and an ammonia sensor arranged downstream of the SCR catalytic converter, comprising:
determining that the internal combustion engine is in an overrun cut-off phase;
interrupting an injection of urea by the urea injection device during the overrun cut-off phase;
acquiring an ammonia reference value from an ammonia reference signal generated by the ammonia sensor during the overrun cut-off phase; and
acquiring a corrected ammonia value from an ammonia signal generated by the ammonia sensor during normal operation of the internal combustion engine, based at least in part on the ammonia reference value,
wherein an acquisition of a nitrogen oxide reference value or the acquisition of the ammonia reference value does not take place until a corrected ammonia value absolute change gradient of a reference signal of a nitrogen oxide sensor is lower than a predetermined change threshold value of nitrogen oxide or if an absolute change gradient of the reference signal of the ammonia sensor is less than a predetermined ammonia change threshold value.

8. The method as claimed in claim 7, wherein the acquisition of the nitrogen oxide reference value or the acquisition of the ammonia reference value does not take place until a nitrogen oxide value is lower than a predetermined nitrogen oxide threshold value and/or the ammonia value is lower than a predetermined ammonia threshold value.

9. The method as claimed in claim 7, further comprising:
acquiring a difference in ammonia between an ammonia value acquired from the ammonia signal generated by the ammonia sensor during a normal operation of the internal combustion engine, and a further ammonia value acquired from the nitrogen oxide signal generated by a nitrogen oxide sensor during the normal operation of the internal combustion engine,
executing, during a subsequent overrun cut-off phase if a difference in ammonia acquired during the normal operation of the internal combustion engine is higher than a predetermined ammonia difference threshold value:
activating the urea injection device to inject a predetermined quantity of urea during a predetermined time period;
acquiring at least one first ammonia value from ammonia signals generated by the ammonia sensor;
determining that a change gradient of the at least one first ammonia value is less than a predetermined first change threshold value;
acquiring at least one second ammonia value from signals generated by a nitrogen oxide sensor;
determining that a change gradient of the at least one second ammonia value is less than a predetermined second change threshold value; and
adapting a slope of a characteristic curve of the ammonia sensor by the second ammonia values if the change gradient of the at least one first or second ammonia value is lower than the predetermined first or second change threshold value.

10. The method as claimed in claim 7, wherein a nitrogen oxide reference value is acquired as follows:

$$NO_{X_{Ref,neu}} = NO_{X_{Ref,alt}} - K_1(T_{t1-t2}) \cdot NO_X$$

where:
$NO_{X_{Ref,neu}}$ nitrogen oxide reference value for a correction,
$NO_{X_{Ref,alt}}$ nitrogen oxide reference value of a preceding correction,
$K_1(T_{t1-t2})$ weighting factor between 0 and 1 depending on an operating time of the internal combustion engine between two corrections, and
$NO_X$ currently acquired nitrogen oxide value (acquired during the overrun cut-off phase of the internal combustion engine, from a nitrogen oxide signal generated by a nitrogen oxide sensor;
and/or wherein the new ammonia reference value is determined as follows:

$$NH_{3_{Ref,neu}} = NH_{3_{Ref,alt}} - K_2(T_{t1-t2}) \cdot NH_3$$

where:
$NH_{3_{Ref,neu}}$ ammonia reference value for a correction,
$NH_{3_{Ref,alt}}$ ammonia reference value of a preceding correction,
$K_2(T_{t1-t2})$ weighting factor between 0 and 1 depending on an operating time of the internal combustion engine between two corrections, and
$NH_3$ currently acquired ammonia value (acquired during the overrun cut-off phase of the internal combustion engine, from an ammonia signal generated by the ammonia sensor.

11. The method as claimed in claim 7, wherein the internal combustion engine has a nitrogen oxide sensor arranged upstream of the SCR catalytic converter, wherein the method further comprises:
acquiring a further nitrogen oxide value from a nitrogen oxide reference signal generated by the nitrogen oxide sensor during the overrun cut-off phase, and
acquiring a corrected further nitrogen oxide value from a nitrogen oxide signal generated by the nitrogen oxide sensor during normal operation of the internal combustion engine, based at least in part on the nitrogen oxide reference value.

12. The method as claimed in claim 7, wherein a corrected nitrogen oxide value which is acquired from a nitrogen oxide signal generated by a nitrogen oxide sensor is corrected as follows with the ammonia value which from the ammonia signal generated by the ammonia sensor:

$$NO_{X_{netto}} = NO_X - NH_3$$

where:
$NO_{X_{netto}}$ nitrogen oxide value which has been corrected and cleaned of ammonia,
$NO_X$ nitrogen oxide value which has been acquired from a nitrogen oxide signal generated by the nitrogen oxide sensor, and
$NH_3$ ammonia value which has been acquired from an ammonia signal generated by the ammonia sensor.

13. An exhaust section for an internal combustion engine, having:
an SCR catalytic converter;
a nitrogen oxide sensor arranged downstream of the SCR catalytic converter and configured to generate a nitrogen oxide signal that indicates a nitrogen oxide value downstream of the SCR catalytic converter;
a urea injection device arranged upstream of the SCR catalytic converter and configured to inject a predetermined quantity of urea;
an ammonia sensor arranged downstream of the SCR catalytic converter and configured to generate an ammonia signal that indicates an ammonia value downstream of the SCR catalytic converter; and
a control unit configured to receive the nitrogen oxide signal and the ammonia signal and execute a method comprising:
determine that the internal combustion engine is in an overrun cut-off phase;
interrupt an injection of urea by the urea injection device during the overrun cut-off phase; and
at least one of:
acquire a nitrogen oxide reference value from a nitrogen oxide reference signal generated by the nitrogen oxide sensor during the overrun cut-off phase and acquire a corrected nitrogen oxide value from a nitrogen oxide signal generated by the nitrogen oxide sensor during normal operation of the internal combustion engine, based at least in part on the nitrogen oxide reference value; and
acquire an ammonia reference value from an ammonia reference signal generated by the ammonia sensor during the overrun cut-off phase and acquire a corrected ammonia value from an ammonia signal generated by the ammonia sensor during normal operation of the internal combustion engine, based at least in part on the ammonia reference value, wherein the acquisition of the nitrogen oxide reference value or the acquisition of the ammonia reference value does not take place until a corrected ammonia value absolute change gradient of the reference signal of the nitrogen oxide sensor is lower than a predetermined change threshold value of nitrogen oxide or if an absolute change gradient of the reference signal of the ammonia sensor is less than a predetermined ammonia change threshold value.

14. The exhaust section as claimed in claim 13, further comprising:

a further nitrogen oxide sensor arranged upstream of the SCR catalytic converter and configured to generate a further nitrogen oxide signal that indicates the quantity of nitrogen oxide upstream of the SCR catalytic converter.

* * * * *